(12) United States Patent
Anders

(10) Patent No.: US 6,200,010 B1
(45) Date of Patent: Mar. 13, 2001

(54) DISPLAY ARRANGEMENT FOR A MOTOR VEHICLE

(75) Inventor: Peter Anders, Hillerse (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/260,588

(22) Filed: Mar. 1, 1999

(30) Foreign Application Priority Data

Feb. 27, 1998 (DE) .............................................. 198 08 393

(51) Int. Cl.$^7$ ................................................. F21W 101/00
(52) U.S. Cl. ...................... 362/511; 362/494; 362/540; 362/545
(58) Field of Search .................................. 362/555, 511, 362/494, 540, 545, 544, 543

(56) References Cited

U.S. PATENT DOCUMENTS

| | | |
|---|---|---|
| 4,588,267 | 5/1986 | Pastore . |
| 4,811,172 * | 3/1989 | Davenport et al. .................. 362/511 |
| 5,037,187 | 8/1991 | Groves et al. . |
| 5,217,290 * | 6/1993 | Windross ............................. 362/511 |
| 5,938,320 * | 8/1999 | Crandall ........................... 362/511 X |

FOREIGN PATENT DOCUMENTS

| | | |
|---|---|---|
| 688444 | 9/1997 | (CH) . |
| 2252854 | 7/1979 | (DE) . |
| 3006403 | 8/1980 | (DE) . |
| 3229746 | 8/1982 | (DE) . |
| 3314515 | 4/1986 | (DE) . |
| 3735847 | 10/1987 | (DE) . |
| 3720848 | 1/1989 | (DE) . |
| 90105893 | 11/1990 | (DE) . |
| 4015329 | 11/1991 | (DE) . |
| 4219001 | 12/1992 | (DE) . |
| 4212258 | 10/1993 | (DE) . |
| 9317007 | 11/1993 | (DE) . |
| 4322937 | 1/1995 | (DE) . |
| 4438666 | 5/1995 | (DE) . |
| 4410620 | 9/1995 | (DE) . |
| 29515369 | 12/1995 | (DE) . |
| 19528967 | 4/1996 | (DE) . |
| 29702746 | 2/1997 | (DE) . |
| 19702746 | 3/1998 | (DE) . |
| 719675 | 7/1996 | (EP) . |
| 785103 | 7/1997 | (EP) . |
| 9220976 | 8/1997 | (JP) . |

* cited by examiner

Primary Examiner—Laura K. Tso
(74) Attorney, Agent, or Firm—Baker Botts L.L.P.

(57) ABSTRACT

A display arrangement to display data on a mirror surface of a motor vehicle surrounded by a housing includes at least one light-emitting element and a corresponding light guide having one end face to receive light from the light-emitting element and another end face located in the housing substantially parallel to the mirror surface. The mirror surface is provided with a light transmissive aperture in the region of the second end face of the light guide.

6 Claims, 2 Drawing Sheets

DISPLAY ARRANGEMENT FOR A MOTOR VEHICLE

BACKGROUND OF THE INVENTION

This invention relates to display arrangements for motor vehicle mirrors.

In the field of automotive technology problems arise first because an ever-increasing quantity of data is provided to a vehicle operator while moving in road traffic, and second because the existing data display space is limited. Moreover, a large number of independent display devices leads to a certain lack of recognition by the operator, rendering timely perception of the information displayed more difficult.

German Offenlegungsschrift No. 37 20 848 discloses a display arrangement for motor vehicles which is incorporated in a structural unit with the rear view mirror of the vehicle. In order to provide the minimum possible interference with the operator's rearward vision in the rear view mirror, an LCD is arranged behind an area of the reflecting surface of the mirror which is partly transmissive to light. The LCD, which is lighted from the rear, is electronically controlled to display data in such manner that the light is visible to the operator through the LCD in the activated and/or unactivated areas and through the partially light-transmissive mirror surface. In order not to restrict the operator's field of vision, an enlarged mirror surface is provided. However, this leads to an enlargement of the overall dimensions of the mirror unit. Another disadvantage is that the dimensions of the LCD and of the associated electronic circuits are very bulky, further increasing the overall dimensions of the rear view mirror unit. Furthermore, such LCDs are very expensive.

German Offenlegungsschrift No. 37 35 847 discloses a rear view mirror having an LCD display surface located in the mirror housing immediately below the mirror surface. However, a disadvantage of this arrangement is that the display area is not located directly within the operator's usual field of view. In order to read the data, therefore, the driver must shift his view downwardly from the mirror.

There are also conventional motor vehicle rear view mirrors having a glass mirror with a phototechnically controlled antiglare layer including a photoelectric transducer connected to an electric circuit arranged on a board. One such rear view mirror is disclosed for example in European Published Application No. 78 51 03 in which a light conductor has a free end face adjacent to the mirror glass and substantially parallel to its outer surface with the other end face is adjacent to a photoelectric transducer mounted on a board.

German Patent No. 197 02 746 discloses an outside rear view mirror having a repeat blinker provided in the mirror housing. To replace conventional incandescent lamps, which generate much heat and are very bulky as well, this reference discloses mounting an LED as a light source in the mirror housing and connecting it by a light guide to a light exit aperture in the mirror housing.

SUMMARY OF THE INVENTION

Accordingly, it is an object of the present invention to provide a display arrangement for a motor vehicle which overcomes disadvantages of the prior art.

Another object of the invention is to provide a display arrangement for a motor vehicle which is located within the field of vision of the vehicle operator and does not require any additional structural space.

These and other objects of the invention are attained by providing a display arrangement for a motor vehicle mirror having a light guide extending between a light-emitting element and a display region in the mirror so that the light-emitting element can be at a location independent of the display region in the mirror, thereby optimally utilizing the available space. The light-emitting element may thus be located anywhere inside the mirror housing or elsewhere in the motor vehicle outside of the mirror housing. This freedom of location, furthermore, permits easier removal of the heat generated by the light-emitting element.

In a preferred embodiment of the invention, the light emitting elements are in the form of LEDs, which are very inexpensive compared to LCDs, have a long service life, and generate comparatively little heat.

Preferably, the light exit aperture in the mirror is made by rendering the mirror glass semitransparent in the region in front of the light guide, so that the visual appearance of the mirror glass is not altered when the display arrangement is not activated.

Furthermore, each light guide may be provided with a lens so that the light of the display arrangement can be directed toward the vehicle operator, thus enhancing perception and at the same time providing a greater degree of freedom as to the location of the light guides. Preferably, the light guides lead to display regions located in areas of the mirror surface in which no important data concerning the traffic around the vehicle are to be expected so that the display arrangement will not encroach on the operator's field of vision.

By providing a large number of light guides capable of being adjusted selectively in the display region, any desired type of representation of the data are possible, for example alphanumeric or symbolic. By providing a program memory component for the LEDs, the user may, for example, select a desired form of representation.

BRIEF DESCRIPTION OF THE DRAWING

Further objects and advantages of the invention will be apparent from a reading of the following description in conjunction with the accompanying drawings, in which.

Figure 1:
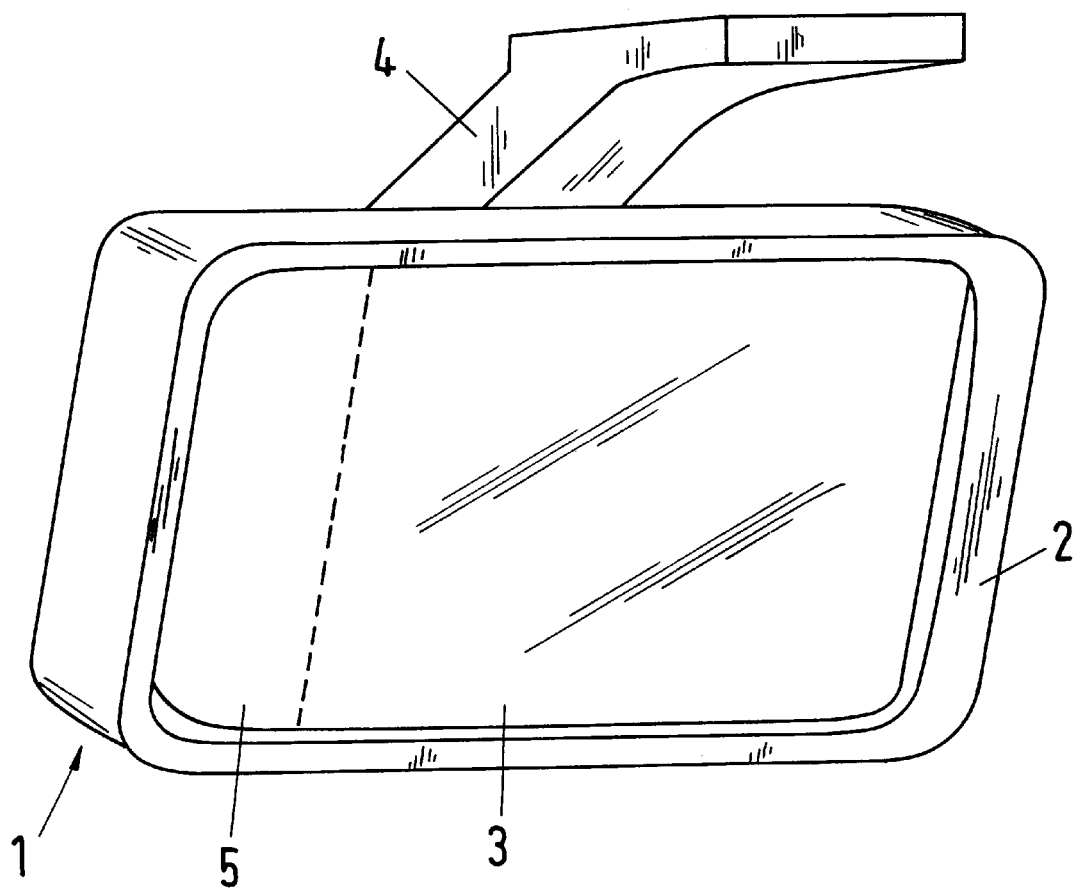
FIG. 1 is a perspective view illustrating a representative embodiment of a motor vehicle rear view mirror display arrangement having a display area on the mirror surface.
Figure 2:
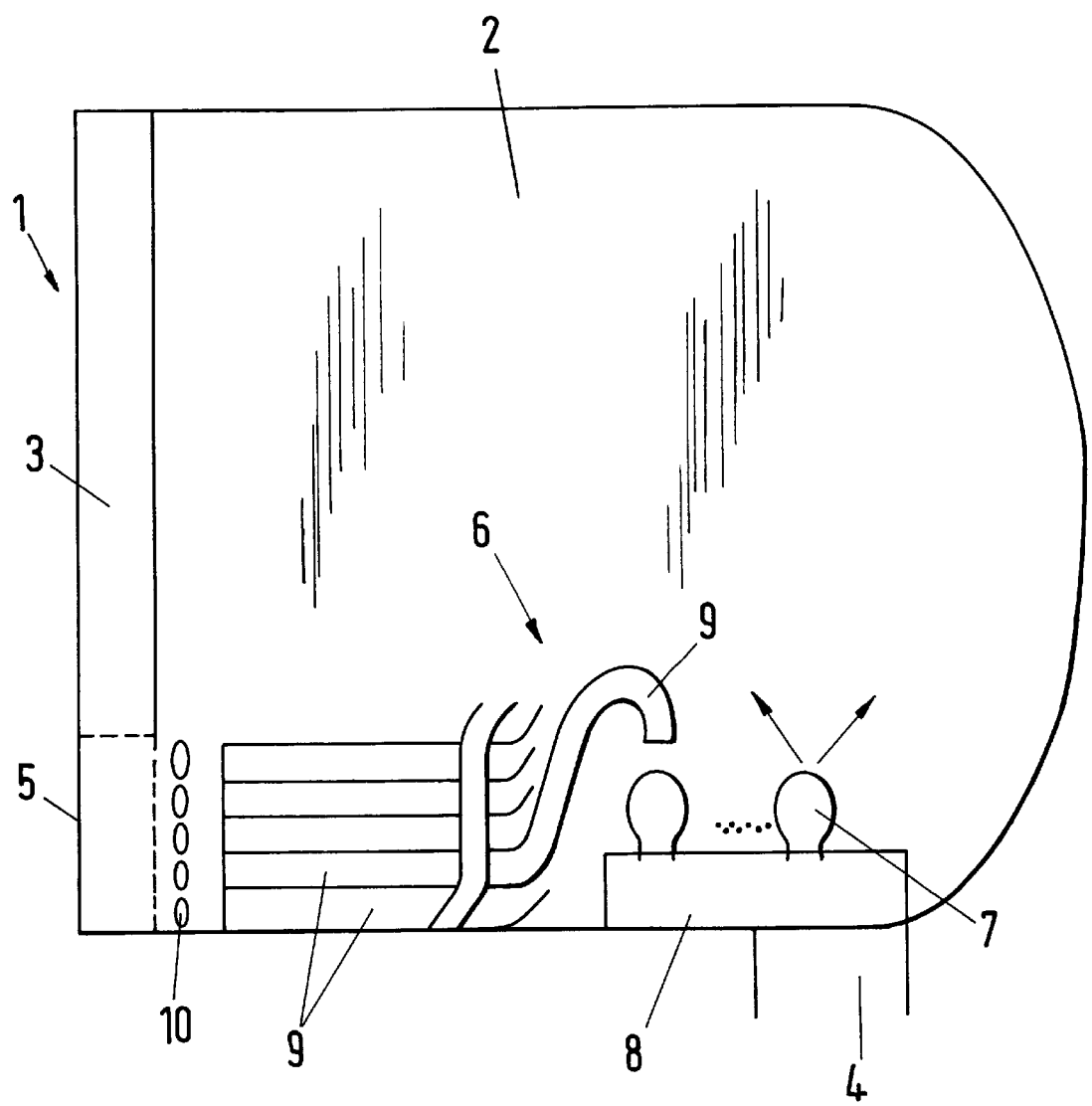
FIG. 2 is a schematic cross-sectional view of the motor vehicle rear view mirror shown in FIG. 1.

In the typical embodiment of the invention shown in FIG. 1, a motor vehicle rear view mirror 1 includes a housing 2, a mirror glass 3, and a mirror mount 4 arranged on the housing. An area of the mirror glass 3 serves additionally as display region 5 of a display arrangement 6, shown in FIG. 2. The display arrangement 6 contains a plurality of luminescence (LED) diodes 7 mounted on a board 8. Each of the luminescence diodes 7 projects light into an end face of a light guide 9 and all light guides 9 are positioned with opposite end surfaces facing and substantially parallel to the mirror glass 3 in the display region 5. The mirror glass 3 has a semitransparent configuration in the display region 5 so as to provide a light transmissive aperture for the LED display. Between the semitransparent mirror glass 3 and the light guides 9, microlenses 10 are positioned to focus the light. Alternatively, the microlenses 10 may be bonded to the end faces of the light guides 9. The board 8 holding the luminescence diodes 7 and the associated actuating electronic circuits, not shown, may be arranged either inside the mirror housing 2 or outside of it. If the board 8 is located inside the housing 2, the electrical supply and signal lines extend through the mirror mount 4 and into the interior of the motor vehicle. But if the board is outside the housing 2, only the light guides 9 extend through the mirror mount 4 into the housing so as to terminate in the display region 5.

As long as the luminescence diodes 7 are not emitting any light, the mirror glass 3 appears, in effect, as an integral whole to a viewer from the outside. Only when individual luminescence diodes 7 are emitting light which is transmitted by the light guides 9 to the display region 5 is the display arrangement visually perceptible from the outside. By suitable actuation of the luminescence diodes 7, any type of data can be represented visually in the display region 5. In FIG. 1, for example, an alphanumeric representation may be pictured in the region 5. The display arrangement 6 may, for example, display data providing support to the operator in overtaking maneuvers or it may serve as visual support for a navigation system.

Although the invention has been described herein with reference to specific embodiments, many modifications and variations therein will readily occur to those skilled in the art. Accordingly, all such variations and modifications are included within the intended scope of the invention.

I claim:

1. A display arrangement for a motor vehicle comprising:
   a mirror surface mounted in a housing;
   at least one light emitting element at a location remote from the mirror surface;
   a light guide associated with the light-emitting element extending between the location remote from the mirror surface and a location adjacent to the mirror surface and having a first end face coupled to receive light from the light-emitting element and a second end face disposed substantially parallel to the mirror surface in the housing, the mirror surface having a light transmissive aperture in the region of the second end face of the light guide.

2. A display arrangement according to claim 1 wherein the light-emitting element is a luminescence diode.

3. A display arrangement according to claim 1 wherein the light transmissive aperture is an opening in or a semitransparent portion of the mirror surface.

4. A display arrangement according to claim 1 wherein the second end face of the light guide has an associated lens by which the emitted light can be directed.

5. A display arrangement according to claim 1 wherein the light transmissive aperture is located in a region of the mirror surface where little traffic monitoring data is to be expected.

6. A display arrangement according to claim 1 including a plurality of light guides located at the light transmissive aperture which are capable of being selectively actuated by light from corresponding light-emitting elements.

* * * * *